(12) United States Patent
Flournoy

(10) Patent No.: US 11,945,655 B1
(45) Date of Patent: Apr. 2, 2024

(54) SYSTEM, APPARATUS, AND METHOD FOR REMOVING AND REPLACING CONVEYOR SYSTEM COMPONENTS

(71) Applicant: Steel Craft Mfg. Inc., Hopewell, VA (US)

(72) Inventor: Ronald B. Flournoy, Hopewell, VA (US)

(73) Assignee: Steel Craft Mfg. Inc., Hopewell, VA (US)

( * ) Notice: Subject to any disclaimer, the term of this patent is extended or adjusted under 35 U.S.C. 154(b) by 0 days.

(21) Appl. No.: 18/502,836

(22) Filed: Nov. 6, 2023

(51) Int. Cl.
 *B65G 21/06* (2006.01)
 *B65G 39/12* (2006.01)

(52) U.S. Cl.
 CPC ............. *B65G 21/06* (2013.01); *B65G 39/12* (2013.01)

(58) Field of Classification Search
 None
 See application file for complete search history.

(56) References Cited

U.S. PATENT DOCUMENTS

| | | | | |
|---|---|---|---|---|
| 3,157,272 | A * | 11/1964 | Bay .................. | B65G 21/06 198/830 |
| 4,034,837 | A * | 7/1977 | Vinarcsik ............ | B65G 39/02 29/256 |
| 4,513,859 | A * | 4/1985 | Long ................ | B65G 39/12 198/842 |
| 6,244,428 | B1 * | 6/2001 | Atkins .............. | B66F 3/245 198/841 |
| 6,549,739 | B2 | 4/2003 | Dettinger | |
| 8,327,516 | B2 | 12/2012 | Kliskey | |
| 8,540,071 | B2 | 9/2013 | Dowling | |
| 8,607,968 | B2 | 12/2013 | Mott | |
| D727,126 | S | 4/2015 | Robinson | |
| 9,333,976 | B2 * | 5/2016 | Kahrger ............. | B65G 39/00 |
| 11,319,159 | B2 * | 5/2022 | Rich ................ | B65G 39/12 |
| 2015/0151917 | A1 * | 6/2015 | Campbell .......... | B65G 39/12 29/402.01 |
| 2022/0048707 | A1 * | 2/2022 | Matl ............... | B65G 47/917 |

FOREIGN PATENT DOCUMENTS

| | | |
|---|---|---|
| AU | 2019201176 A1 | 9/2020 |
| CN | 112873121 A | 6/2021 |
| JP | 3743032 B2 * | 2/2006 |

* cited by examiner

*Primary Examiner* — Kavel Singh
(74) *Attorney, Agent, or Firm* — Keefe IP Law, PLLC

(57) ABSTRACT

An apparatus for a conveyor system is disclosed. The apparatus has a housing assembly, a protrusion assembly including a base member and a probe member, the base member being attached to the housing assembly, a collar assembly that is movably attached to the housing assembly and movable between a first position and a second position, and a biasing member disposed in the housing assembly and configured to bias the collar assembly away from the base member and to the first position. A tip portion of the probe member is disposed in the collar assembly in the first position and the tip portion protrudes out of the collar assembly in the second position. The collar assembly includes a collar end cavity that is configured to receive a conveyor component of the conveyor system.

23 Claims, 9 Drawing Sheets

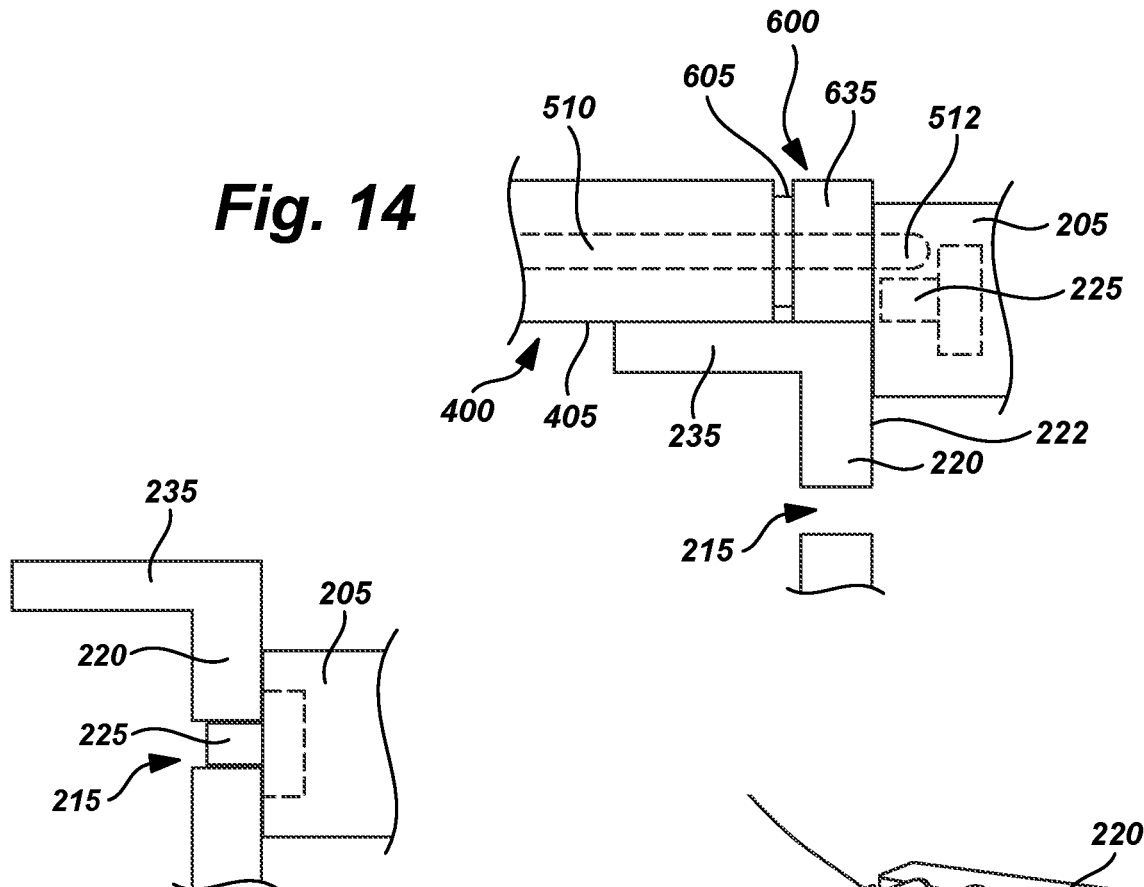
Fig. 14
Fig. 15
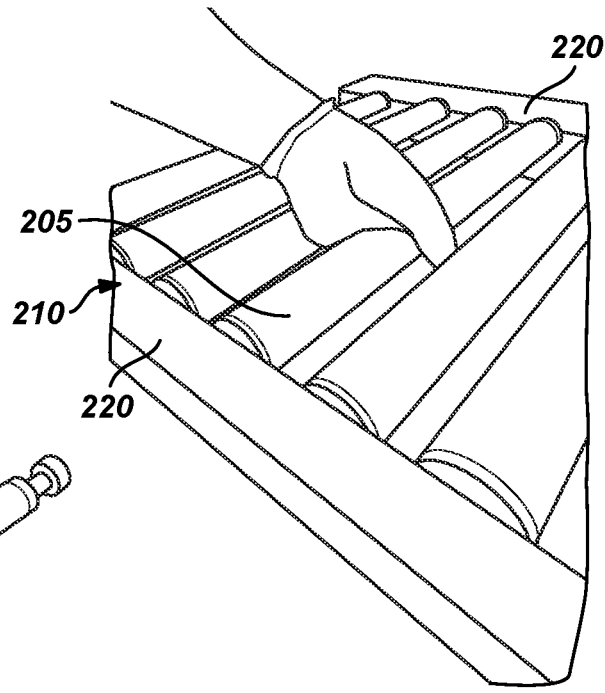
Fig. 16

SYSTEM, APPARATUS, AND METHOD FOR REMOVING AND REPLACING CONVEYOR SYSTEM COMPONENTS

TECHNICAL FIELD

The present disclosure generally relates to a system, apparatus, and method for conveyor systems, and more particularly to a system, apparatus, and method for removing and/or replacing conveyor system components.

BACKGROUND

Warehouses and distribution centers such as for mail distribution and for servicing large internet marketplaces typically include many conveyor systems. For example, large hubs and distribution centers may have miles of conveyor systems configured to service the distribution of mail, packages, and orders.

These conveyor systems are often heavily used over extended periods of time, with significant wear and tear of components. Accordingly, a significant amount of maintenance is involved in maintaining these conveyor systems in serviceable condition. One component of conveyor systems involving repair and/or replacement are conveyor system rollers. For example, large conveyor systems may include a large number of rollers for moving mail and boxes along a conveyor system, each of which may be subject to repair and/or replacement. Accordingly over time, a large number of rollers are removed and/or replaced by workers.

A common technique for removing and replacing rollers involves using a flat tip screwdriver to actuate a component of a roller so that the roller can be removed from a roller bed. As workers use screwdrivers to push against rollers, it is common for the screwdrivers to slip as the screwdriver is pushed against the roller. Accordingly, it may take a worker several attempts with a screwdriver to successfully remove a given roller. Also, because the tips of screwdrivers are typically sharp, injury to workers may occur when screwdrivers slip during roller removal, with the screwdrivers often poking or cutting hands or other body parts of workers. Accordingly, a need in the art currently exists for efficiently and safely removing and/or replacing conveyor system rollers.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus for a conveyor system. The apparatus includes a housing assembly, a protrusion assembly including a base member and a probe member, the base member being attached to the housing assembly, a collar assembly that is movably attached to the housing assembly and movable between a first position and a second position, and a biasing member disposed in the housing assembly and configured to bias the collar assembly away from the base member and to the first position. A tip portion of the probe member is disposed in the collar assembly in the first position and the tip portion protrudes out of the collar assembly in the second position. The collar assembly includes a collar end cavity that is configured to receive a conveyor component of the conveyor system.

In another aspect, the present disclosure is directed to a method for removing a roller from a roller bed assembly of a conveyor system. The method includes using a tool including a housing assembly, a protrusion assembly including a base member and a probe member, the base member being attached to the housing assembly, a collar assembly that is movably attached to the housing assembly and movable between a first position and a second position, the collar assembly having a collar end cavity, and a biasing member disposed in the housing assembly and configured to bias the collar assembly away from the base member and to the first position. The method also includes contacting the roller with the tool so that a movable protrusion of the roller is received in the collar end cavity, and pressing the tool against the movable protrusion so that the collar assembly is moved from the first position to the second position, with a tip portion of the probe member moving from within the collar assembly in the first position to protrude out of the collar assembly in the second position.

BRIEF DESCRIPTION OF THE DRAWINGS

FIG. 14 is another sectional view illustrating an exemplary use of an exemplary embodiment of the present invention;

FIG. 15 is another sectional view illustrating an exemplary use of an exemplary embodiment of the present invention;

FIG. 16 is another perspective view illustrating an exemplary use of an exemplary embodiment of the present invention.

DETAILED DESCRIPTION AND INDUSTRIAL APPLICABILITY

Figure 1:
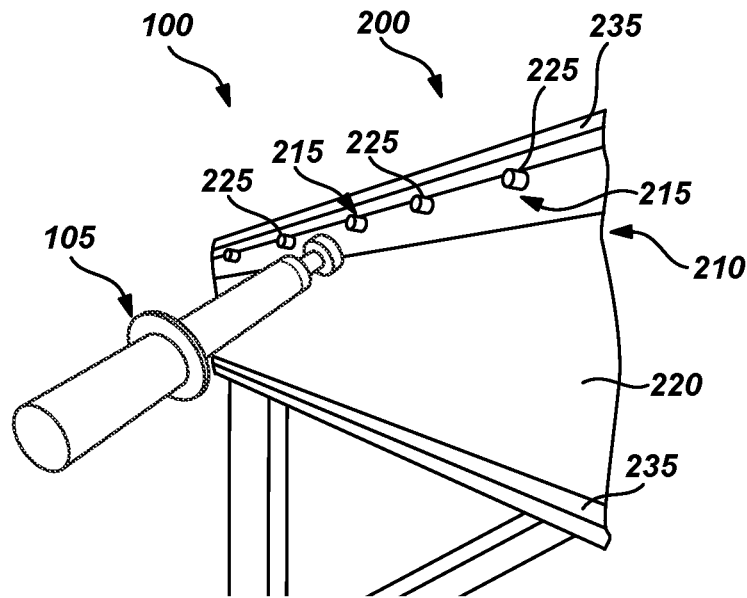
FIG. 1 is a perspective view of an exemplary embodiment of the present invention.
Figure 2:
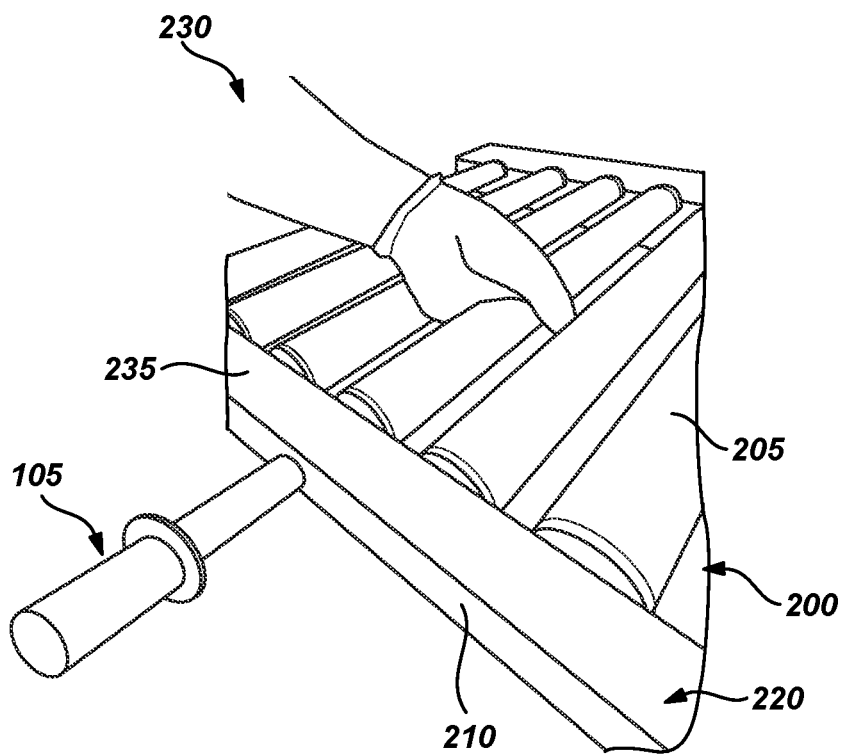
FIG. 2 is another perspective view of an exemplary embodiment of the present invention.

The exemplary disclosed system, apparatus, and method may include an apparatus that may be a tool for maintaining, repairing, and/or replacing components of a machine such as, for example, a conveyor system. FIGS. 1 and 2 illustrate an exemplary disclosed system 100 that may include an apparatus 105 that may be a tool. In at least some exemplary embodiments, apparatus 105 may be used to maintain, repair, and/or replace rollers 205 of a conveyor system 200.

In at least some exemplary embodiments, conveyor system 200 may include a roller bed assembly 210. Roller bed assembly 210 may include a plurality of apertures 215 disposed in one or more bed walls 220 that may be configured to removably receive a conveyor component (e.g., a movable protrusion 225 of roller 205 or any other suitable component) of conveyor system 200. For example, roller bed assembly 210 may include a plurality of bed walls 220 that may be elongated members that are spaced apart from each other. Apertures 215 may be disposed in each bed wall 220, and apertures 215 of opposing bed walls 220 may be aligned with each other. For example, each roller 205 may include movable protrusions 225 disposed at both end portions of each roller 205. Rollers 205 may be removably inserted between bed walls 220 based on movable protrusions 225 being pushed into an interior of a given roller 205 as roller 205 is inserted, with the movable protrusions 225 being movable into respective apertures 215 when a given movable protrusion 225 is aligned with a given aperture 215. For example, each movable protrusion 225 may be biased by a component (e.g., a spring, elastomeric member, or any other suitable biasing member) of roller 205 to protrude out of roller 205 when no force is applied to movable protrusion 225. For example, movable protrusions 225 may be spring-loaded movable protrusions that may be selectively pushed into an interior of roller 205 when desired (e.g., when roller 205 is being inserted into roller bed assembly 210) and may move outward from an interior of roller 205 for example when a force (e.g., from a tool such as the exemplary disclosed tool) is removed and a given movable protrusion 225 is aligned with a given aperture 215. Roller 205 may thereby be removed from roller bed assembly 210 based on one movable protrusion 225 or a plurality of movable protrusions 225 of a given roller 205 being pressed inward into an interior of roller 205. For example, roller 205 may include movable protrusions 225 on one or both end portions.

In at least some exemplary embodiments, movable protrusion 225 and aperture 215 may be configured to correspond to each other. For example, movable protrusion 225 may have a polygonal shape (e.g., hexagon, rectangle, or any other desired shape) that may be received in aperture 215 that may have a corresponding shape (e.g., circular, hexagon, rectangle, or any other desired shape). In at least some exemplary embodiments, movable protrusion 225 may form a hex-shaped protrusion (e.g., or any other configuration) that may extend through aperture 215 and may be visible to and/or engaged by a worker for example using the exemplary disclosed apparatus. In at least some exemplary embodiments, movable protrusion 225 may be a spring-loaded hex head shaft that may be selectively movable (e.g., selectively urged based on the exemplary disclosed apparatus pressing against movable protrusion 225) into an interior of roller 205. Bed wall 220 may be any desired shape such as, for example, a channel shape having one or more flanges 235 (e.g., a top flange and/or a bottom flange that may extend horizontally). Bed walls 220 may be attached together using any suitable attachment technique such as, for example, mechanical fasteners (e.g., bolts), welding, and/or any other desired technique. Bed walls 220 may also be integral portions or members of roller bed assembly 210 (e.g., may be integrally formed). Roller 205, bed wall 220, and/or movable protrusion 225 may be formed from any suitable structural material such as, for example, metal, structural plastic, structural ceramic material, wood, composite material, and/or any other suitable structural material. For example, structural components of conveyor system 200 may be formed from steel (e.g., stainless steel).

In at least some exemplary embodiments, conveyor system 200 may be used to move, distribute, and/or ship items such as packages, boxes, and/or any other desired shipment materials. For example, items may be moved along roller bed assembly 210 based on rollers 205 being freely rotatable about their longitudinal axis when one or more movable protrusions 225 are received in apertures 215. For example, items may be easily pushed along conveyor system 200 based on the items moving along freely rotatable rollers 205.

Apparatus 105 may be used for maintaining, installing, repairing, and/or replacing rollers 205. Apparatus 105 may be a roller maintenance tool (e.g., a roller maintenance, installation, repair, and/or replacement tool). Apparatus 105 may be used to remove roller 205 from roller bed assembly 210 and/or replace roller 205 in roller bed assembly 210. As illustrated in FIGS. 3-6, 7A, and 7B, apparatus 105 may include a handle assembly 300, a housing assembly 400, a protrusion assembly 500, a collar assembly 600, and a biasing member 700. Housing assembly 400 may be disposed in handle assembly 300 and may house protrusion assembly 500 and collar assembly 600. Biasing member 700 may bias a movement of collar assembly 600 relative to housing assembly 400.

Figure 4:
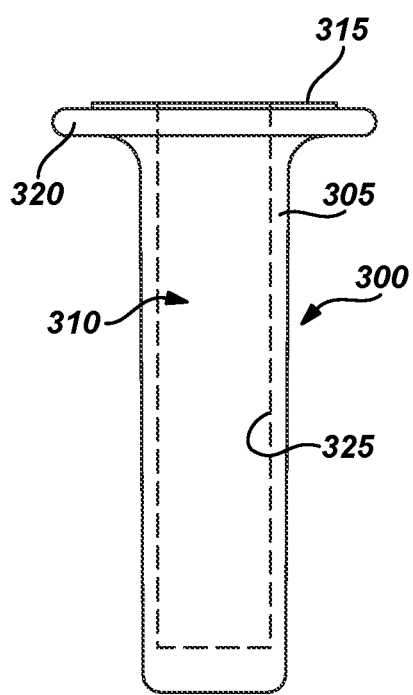
FIG. 4 is another sectional view of another exemplary component of an exemplary embodiment of the present invention.
Figure 7A:
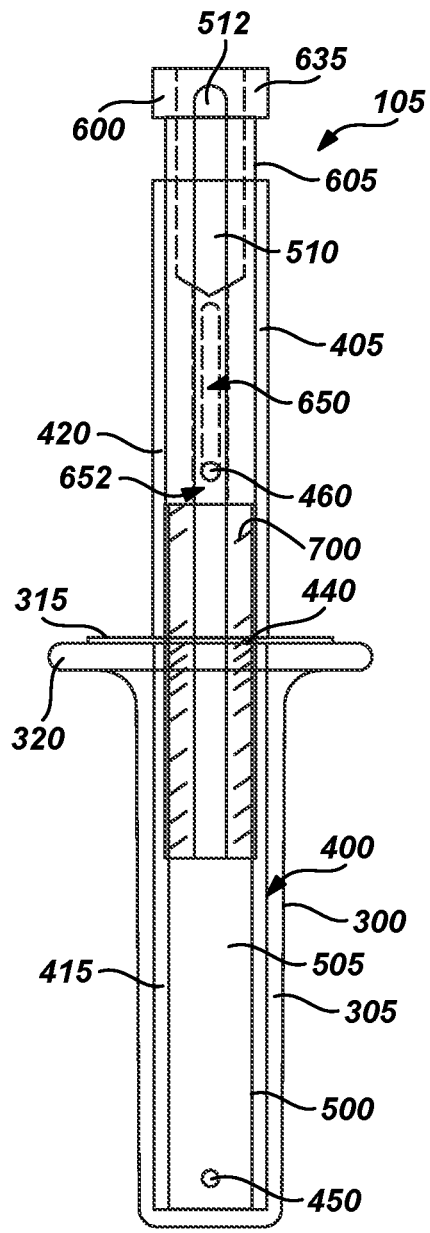
FIG. 7A is a sectional view of an exemplary embodiment of the present invention.
Figure 7B:
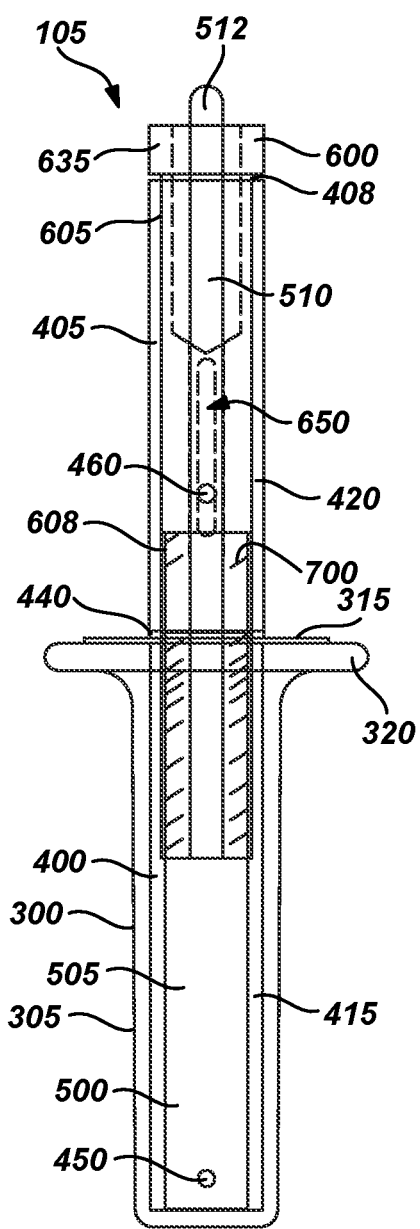
FIG. 7B is another sectional view of an exemplary embodiment of the present invention.

Handle assembly 300 may be any suitable assembly for facilitating gripping and manipulation of apparatus 105 by a user (e.g., worker 230). For example as illustrated in FIG. 4, handle assembly 300 may include a handle body 305. Handle body 305 may be formed from any suitable structural material such as, for example, metal, structural plastic, wood, composite material, and/or any other suitable structural material. For example, structural components of handle body 305 may be formed from steel (e.g., stainless steel), tool steel, aluminum, and/or any other suitable structural material. Handle body 305 may have a shape (e.g., cross-section) that may be annular, circular, elliptical, polygonal, and/or any other suitable shape (e.g., suitable for gripping). Handle body 305 may be coated and/or covered with grippable material such as, for example, rubber or elastomeric material, plastic, polyurethane, plastisol, and/or any other suitable material to facilitate grasping of handle assembly 300 by a user. A handle cavity 310 may be formed in handle body 305. Handle cavity 310 may be configured to receive housing assembly 400 for example as illustrated in FIGS. 7A and 7B. Returning to FIG. 4, handle assembly 300 may also include a retaining member 315 and a protective flange 320. Protective flange 320 may be an integral portion of handle body 305 that protrudes or extends out from handle body 305 to provide protection to a user's hand and/or to facilitate gripping of apparatus 105 by a user. Retaining member 315 may help to maintain an attachment of housing assembly 400 to handle assembly 300. For example, retaining member 315 may be a no slip washer (e.g., a no slip metal washer).

Additionally for example, housing assembly 400 may be attached to handle assembly 300 via mechanical fasteners, adhesive disposed on an interior surface 325 of handle assembly 300 forming handle cavity 310, snap-fit attachment, press-fit attachment, and/or any other suitable attachment technique.

Figure 6:
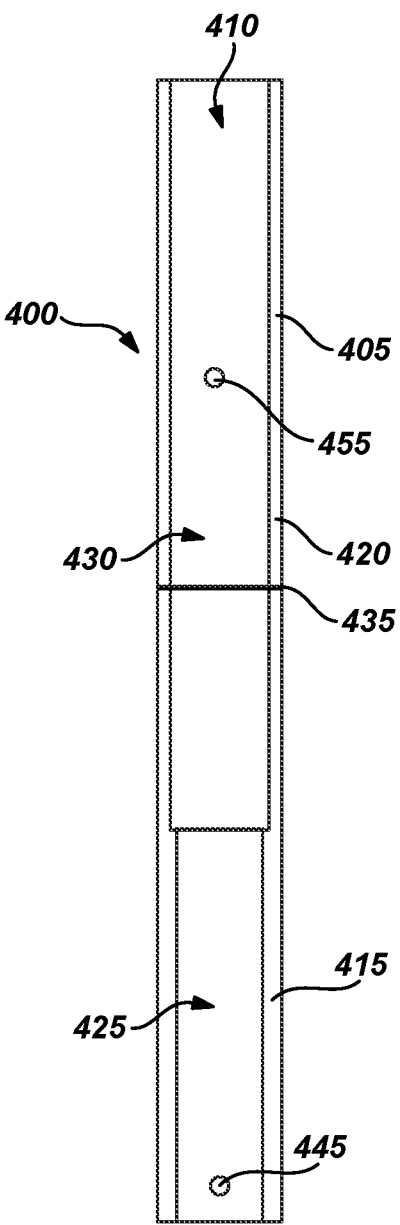
FIG. 6 is another sectional view of another exemplary component of an exemplary embodiment of the present invention.

Housing assembly 400 may be any suitable assembly for being received in and attached to handle assembly 300 and for receiving (e.g., housing) protrusion assembly 500 and/or collar assembly 600. For example as illustrated in FIG. 6, housing assembly 400 may be an elongated, hollow member. Housing assembly 400 may include a housing wall 405 that may form an elongated cavity 410 that may extend along a length of housing assembly 400. Housing wall 405 may be formed from similar material and/or may have a similar shape (e.g., cross-section) as handle body 305 for example as described above. Housing wall 405 may be an integral member forming elongated cavity 410, or may be formed from a plurality of wall sections that may be attached together via any suitable technique such as, for example, welding, mechanical fasteners, and/or any other suitable attachment technique. In at least some exemplary embodiments, housing wall 405 may be aluminum tubing. Housing wall 405 may have any suitable length for providing a tool housing such as, for example, between about 4" and about 14", between about 5" and about 12", or between about 6" and about 10" (e.g., about 8").

Housing wall 405 may include a first housing wall section 415 and a second housing wall section 420. First housing wall section 415 and second housing wall section 420 may have different section thicknesses. For example, first housing wall section 415 may have a greater thickness than second housing wall section 420, with a first housing cavity section 425 formed by first housing wall section 415 having a smaller cross-section than a second housing cavity section 430 formed by second housing wall section 420. Housing assembly 400 may have any suitable diameter such as, for example, between about 0.5 inches and about 2 inches, or between about ¾" and about 1 inch (e.g., about ⅞"). First housing wall section 415 may have any suitable thickness for forming first housing cavity section 425 such as, for example, between about ¹⁄₁₆" and about ¼" (e.g., about ⅛"). First housing cavity section 425 may have any suitable width or diameter such as, for example, between about ½" and about ¾" (e.g., about 0.6"). First housing cavity section 425 may be configured to receive protrusion assembly 500, but may be too small or narrow to receive collar assembly 600 and/or biasing member 700. Second housing wall section 420 may have any suitable thickness for forming second housing cavity section 430 such as, for example, between about ¹⁄₁₆" and about ¼" (e.g., about ³⁄₃₂"). Second housing cavity section 430 may have any suitable width or diameter such as, for example, between about ½" and about ¾" (e.g., about 0.7"). Second housing cavity section 430 may be configured to receive collar assembly 600 and biasing member 700.

A groove 435 may be formed in housing wall 405. Groove 435 may be a ring groove (e.g., a snap ring groove). Groove 435 may be configured to receive a portion of a ring member 440 (e.g., a ring such as a snap ring) to help fasten housing assembly 400 to handle assembly 300 for example as illustrated in FIGS. 7A and 7B. For example, ring member 440 may be attached at (e.g., snugly and/or snappably received in) groove 435 at a location of retaining member 315 to help fixedly attach housing assembly 400 to handle assembly 300. Groove 435 and ring member 440 may have any suitable thickness such as, for example, up to 0.1" or 0.05" (e.g., between about 0.03" and about 0.04"). Returning to FIG. 6, a first roll pin aperture 445 may be disposed in first housing wall section 415. First roll pin aperture 445 may be configured to receive a roll pin 450 for example as illustrated in FIGS. 7A and 7B for helping to attach (e.g., fixedly attach) protrusion assembly 500 to housing assembly 400 (e.g., and/or to handle assembly 300). First roll pin aperture 445 and roll pin 450 may have any suitable diameter such as, for example, about ⅛". Returning to FIG. 6, a dowel pin aperture 455 may be disposed in second housing wall section 420. Dowel pin aperture 455 may be configured to receive a dowel pin 460 for example as illustrated in FIGS. 7A and 7B for helping to attach (e.g., movably attach) collar assembly 600 to housing assembly 400. Dowel pin aperture 455 and dowel pin 460 may have any suitable width or diameter such as, for example, about ⅛". Dowel pin 460 may be attached at (e.g., fixedly attached within) dowel pin aperture 455.

Figure 5:
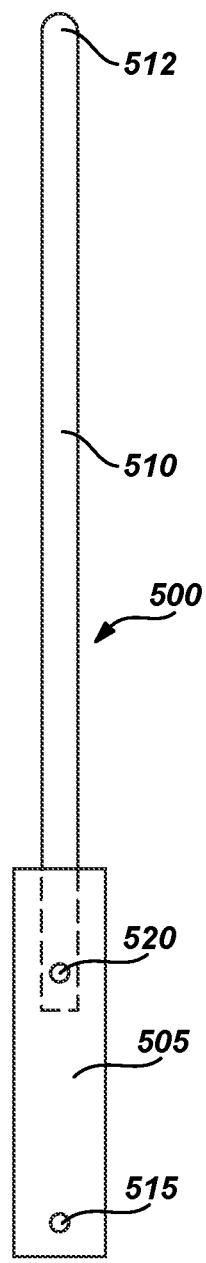
FIG. 5 is another sectional view of another exemplary component of an exemplary embodiment of the present invention.

Protrusion assembly 500 may be any suitable assembly for being received in and attached to housing assembly 400. For example as illustrated in FIG. 5, protrusion assembly 500 may include a base member 505 and a probe member 510. Base member 505 and probe member 510 may be formed from similar material as handle body 305 for example as described above. Base member 505 may have a generally similar cross-section as housing wall 405 and may be configured to be received and fit (e.g., fit snugly or tightly) in first housing cavity section 425 of housing assembly 400. For example, base member 505 may be a hollow (e.g., or partially solid or solid) elongated member that may be similar to, but sized smaller than, first housing wall section 415 of housing wall 405. A second roll pin aperture 515 may be formed in base member 505. Second roll pin aperture 515 may be similar to first roll pin aperture 445, and may both be configured to receive roll pin 450 that may fasten (e.g., fixedly fasten) base member 505 to first housing wall section 415 of housing assembly 400. A base fastener 520 that may be similar to roll pin 450 may be received in apertures of base member 505 and probe member 510 as illustrated in FIG. 5 to attach (fixedly attach) probe member 510 to base member 505. Probe member 510 may thereby be attached (e.g., fixedly or substantially immovably attached) to housing assembly 400 via the exemplary disclosed attachments described above of base member 505 and first housing wall section 415 of housing wall 405. Probe member 510 may be a solid or partially solid elongated member that may extend along a length of second housing cavity section 430. Probe member 510 may extend through collar assembly 600 that may be movably attached to housing assembly 400 for example as described below. Probe member 510 may have any suitable length for being housed by housing assembly 400 such as, for example, between about 3" and about 13", between about 4" and about 10", or between about 5" and about 9" (e.g., about 7"). Probe member 510 may have any suitable diameter for use in the exemplary disclosed apparatus such as, for example, between about ⅛" and about ½" (e.g., about ¼"). Probe member 510 may have a tip portion 512 that may selectively protrude from apparatus 105 for example as further described below.

Figure 3:
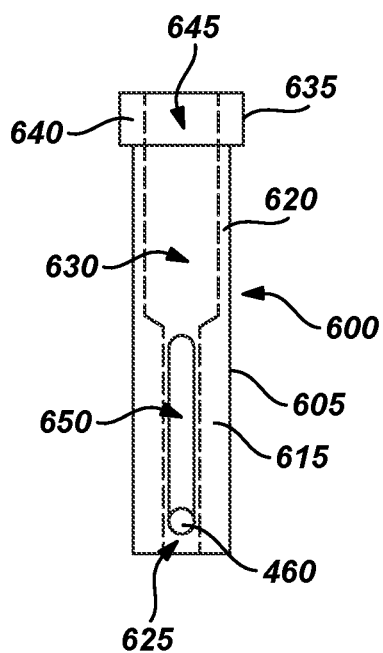
FIG. 3 is a sectional view of an exemplary component of an exemplary embodiment of the present invention.

Collar assembly 600 may be any suitable assembly for being received in and/or movably attached to housing assembly 400. For example as illustrated in FIG. 3, collar assembly 600 may include a collar member 605. Collar member 605 may be formed from similar material as handle body 305 for example as described above. For example in at least some exemplary embodiments, collar member 605 may be formed from plastic material (e.g., structural plastic material such as nylon plastic). Collar member 605 may include a first collar wall section 615 and a second collar wall section 620. First collar wall section 615 and second collar wall section 620 may have different section thicknesses. For example, first collar wall section 615 may have a greater thickness than second collar wall section 620, with a first collar cavity section 625 formed by first collar wall section 615 having a smaller cross-section than a second collar cavity section 630 formed by second collar wall section 620. First collar wall section 615 may have any suitable thickness for forming first collar cavity section 625 such as, for example, between about 1/16" and about 1/4" (e.g., about 0.2"). First collar cavity section 625 may have any suitable width or diameter such as, for example, between about 1/8" and about 3/8" (e.g., about 1/4"). First collar cavity section 625 may be configured to receive probe member 510. Second collar wall section 620 may have any suitable thickness for forming second collar cavity section 630 such as, for example, between about 1/32" and about 1/8" (e.g., about 1/16"). Second collar cavity section 630 may have any suitable width or diameter such as, for example, between about 3/8" and about 3/4" (e.g., about 1/2"). Second collar cavity section 630 may be configured to receive probe member 510.

Collar member 605 may also include a collar portion 635 that may form a flange at an end portion of collar member 605 for example as illustrated in FIG. 3. Collar portion 635 may be urged or pressed against movable protrusion 225. Collar portion 635 may have a third collar wall section 640 that may be thicker than first collar wall section 615 and second collar wall section 620. Third collar wall section 640 may have any suitable thickness for forming a collar end cavity 645 such as, for example, between about 1/8" and about 1/4" (e.g., about 0.2"). Collar end cavity 645 may have a polygonal cross-section such as, for example, a hexagonal or rectangular cross-section. For example, collar end cavity 645 may be configured to receive and fit around movable protrusion 225. In at least some exemplary embodiments, collar end cavity 645 may be configured to receive and fit around movable protrusion 225 that may be shaped as a hexagon of any suitable dimensions (e.g., a hexagon of between about 1/2" and about 1" such as, for example, about 7/16" width or diameter hex). Collar member 605 may have any suitable length for being received by housing assembly 400 such as, for example, between about 2" and about 6", or between about 3" and about 4" (e.g., about 3½" or about 3⅜").

A slot 650 may be formed in first collar wall section 615 of collar member 605. Slot 650 may have any suitable configuration for movably receiving dowel pin 460. For example, slot 650 may have a width of between about 1/8" and about 1/4" (e.g., about 0.2") and a length of between about 3/4" and 2" (e.g., about 1.25"). Slot 650 may be moved (e.g., may translate) relative to dowel pin 460 based on a movement of collar assembly 600 relative to housing assembly 400. In at least some exemplary embodiments, dowel pin 460 may be received in dowel pin aperture 455 and slot 650 and also may be disposed between (e.g., maintained or held between) dowel pin aperture 455 and slot 650 and probe member 510. For example, probe member 510 may substantially prevent dowel pin 460 from being removed from dowel pin aperture 455 and slot 650. In at least some exemplary embodiments, dowel pin 460 may be fixedly attached at or within dowel pin aperture 455. Slot 650 may also serve to guide an aligned movement (e.g., straight movement) of collar assembly 600 relative to housing assembly 400 based on dowel pin 460 being moved along at least part of a length of slot 650. Further, first collar cavity section 625 that may be sized slightly larger than a diameter of probe member 510 may help to guide an aligned movement (e.g., straight movement) of collar assembly 600 relative to housing assembly 400.

Biasing member 700 may be disposed in second housing cavity section 430. As illustrated in FIGS. 7A and 7B, biasing member 700 may be disposed in housing assembly 400 (e.g., in elongated cavity 410) between collar assembly 600 and base member 505 of protrusion assembly 500. Probe member 510 of protrusion assembly 500 may extend through biasing member 700. Biasing member 700 may be any suitable biasing member for urging collar assembly 600 to move away from base member 505. Biasing member 700 may be any suitable biasing member such as, for example, an elastic or flexible member. Biasing member 700 may be a spring, an elastomeric or rubber member, or any other suitable material or member for biasing collar assembly 600. In at least some exemplary embodiments, biasing member 700 may be a metal spring (e.g., a stainless steel spring) or a spring formed from any other suitable material for deforming to store potential energy. Biasing member 700 may be deformed (e.g., compressed or extended) based on any suitable amount of deformation force such as, for example, up to about 10 pounds (e.g., about 3 to 6 pounds) or up to about 5 pounds (e.g., about 4 to 5 pounds).

Apparatus 105 may be actuated between a first position (e.g., a shielding position) as illustrated in FIG. 7A and a second position (e.g., a protruding position) as illustrated in FIG. 7B. For example, collar assembly 600 may be moved between a first position as illustrated in FIG. 7A and a second position as illustrated in FIG. 7B. The shielding position illustrated in FIG. 7A may be a default position of apparatus 105 when apparatus 105 is not in use. The protruding position as illustrated in FIG. 7B may be a position of apparatus 105 when apparatus 105 is pressed by a user against a component such as a roller.

As illustrated in FIG. 7A, protrusion assembly 500 may be disposed substantially entirely within apparatus 105 when apparatus 105 is in the shielding position. Biasing member 700 may urge (e.g., may uncompress or expand to urge) collar assembly 600 away from base member 505 so that collar assembly 600 extends out of housing assembly 400 and collar portion 635 is moved away from housing wall 405. Collar assembly 600 may be retained in housing assembly 400 based on dowel pin 460 contacting and biasing against a slot end wall 652 of collar member 605 forming an end portion of slot 650. Dowel pin 460 contacting and biasing against slot end wall 652 may substantially prevent collar assembly 600 from extending further from housing assembly 400 as the extension amount that is illustrated in FIG. 7A. Biasing from biasing member 700 against collar assembly 600 may maintain collar assembly 600 in the extended position illustrated in FIG. 7A, with collar portion 635 covering or shielding tip portion 512 of probe member 510.

Apparatus 105 may be actuated from the shielding position illustrated in FIG. 7A to the protruding position illustrated in FIG. 7B. For example, apparatus 105 may be actuated to the protruding position illustrated in FIG. 7B when a user presses apparatus 105 (e.g., collar portion 635) against the exemplary disclosed roller (e.g., against movable protrusion 225). As illustrated in FIG. 7B in the protruding position, collar assembly 600 may be urged in a direction toward base member 505 so that collar assembly 600 is retracted into housing assembly 400. For example, force greater than the deformation force described above regarding biasing member 700 may be applied to biasing member 700 from collar assembly 600 (e.g., an end portion 608 of collar member 605). Biasing member 700 may be deformed (e.g., may be compressed) as collar assembly is moved toward the protruding position illustrated in FIG. 7B. For example, as collar portion 635 is pressed against an object such as movable protrusion 225, collar assembly 600 is pushed into (e.g., retracted into) housing assembly 400. Because probe member 510 may be fixedly attached to housing assembly 400 by attachment via base member 505, probe member 510 may not move as collar assembly 600 is pushed toward base member 505. Tip portion 512 may thereby protrude from apparatus 105 based on the movement of collar assembly 600 to the protruding position of FIG. 7B. A movement of collar assembly 600 may be guided (e.g., guided in substantially straight alignment) based on a movement of slot 650 relative to dowel pin 460 and movement of first collar cavity section 625 relative to probe member 510. A movement of collar assembly 600 in a direction toward base member 505 may not proceed further than the protruding position illustrated in FIG. 7B based on collar portion 635 contacting and abutting against a housing end portion 408 of housing wall 405 for example as illustrated in FIG. 7B.

The exemplary disclosed system, apparatus, and method may be used in any suitable application for maintaining, repairing, and/or replacing components of a conveyor system. For example, the exemplary disclosed system, apparatus, and method may be used in any suitable application for repairing and/or replacing rollers of a conveyor system. The exemplary disclosed system, apparatus, and method may be used in any suitable application for actuating a component such as a spring-loaded component. The exemplary disclosed system, apparatus, and method may be used in any suitable application for removing and/or replacing a component of an assembly or a machine.

Figure 8:
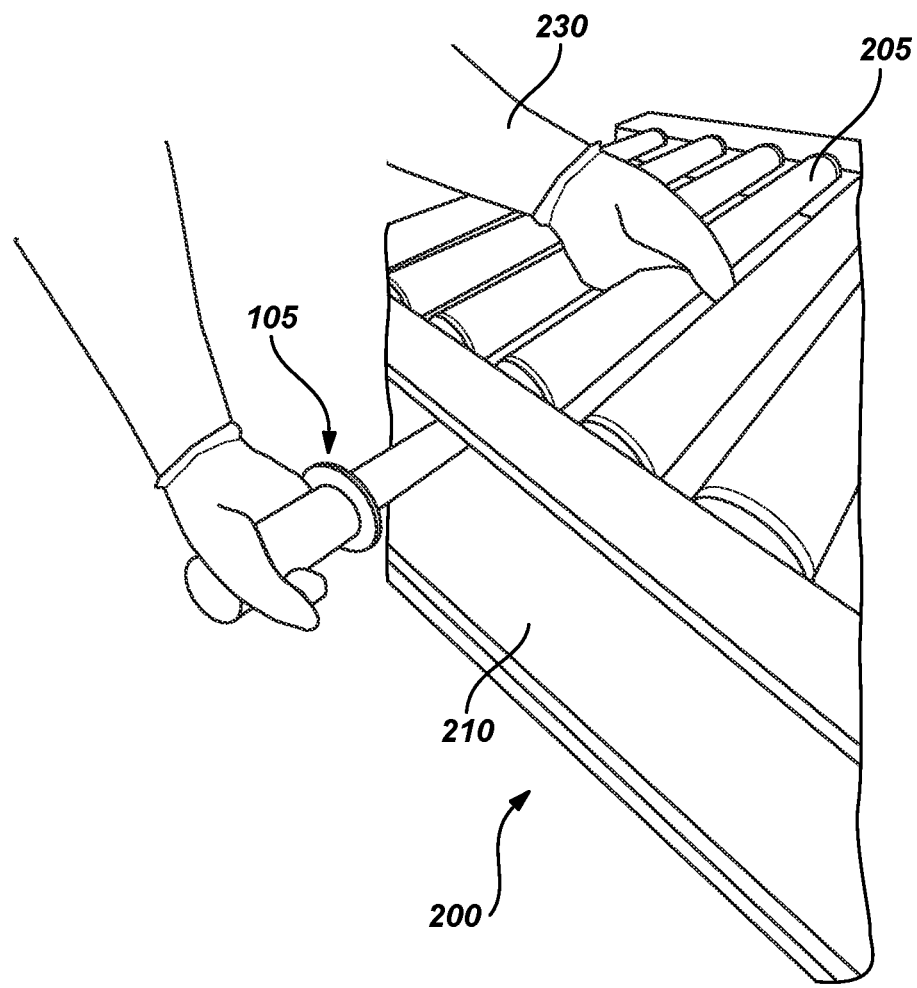
FIG. 8 is a perspective view illustrating an exemplary use of an exemplary embodiment of the present invention.
Figure 9:
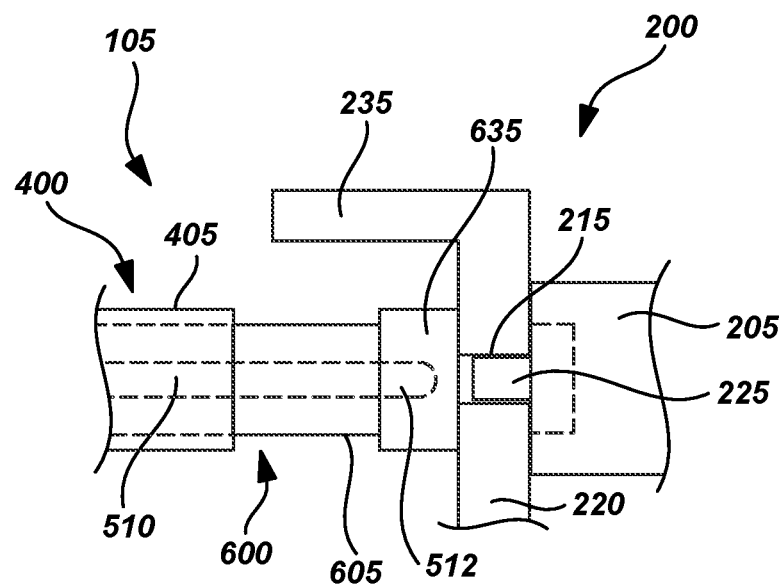
FIG. 9 is a sectional view illustrating an exemplary use of an exemplary embodiment of the present invention.
Figure 10:
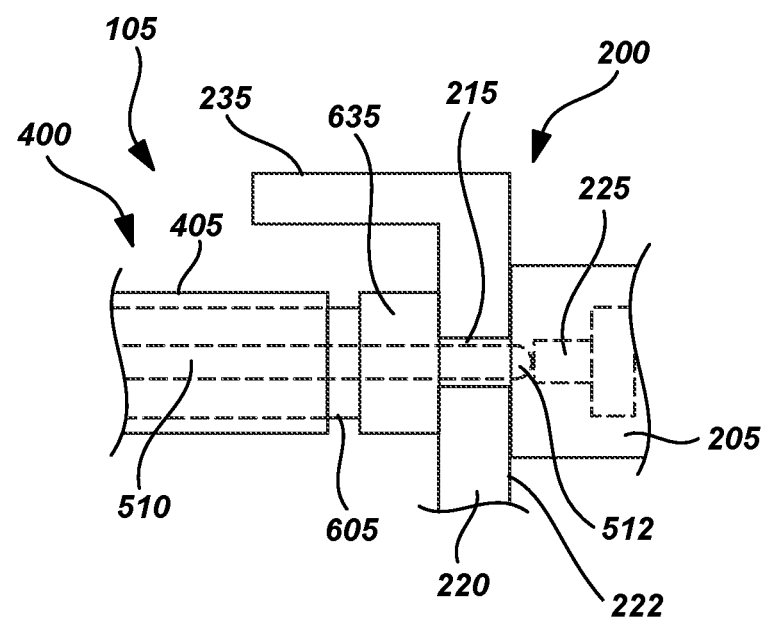
FIG. 10 is another sectional view illustrating an exemplary use of an exemplary embodiment of the present invention.
Figure 11:
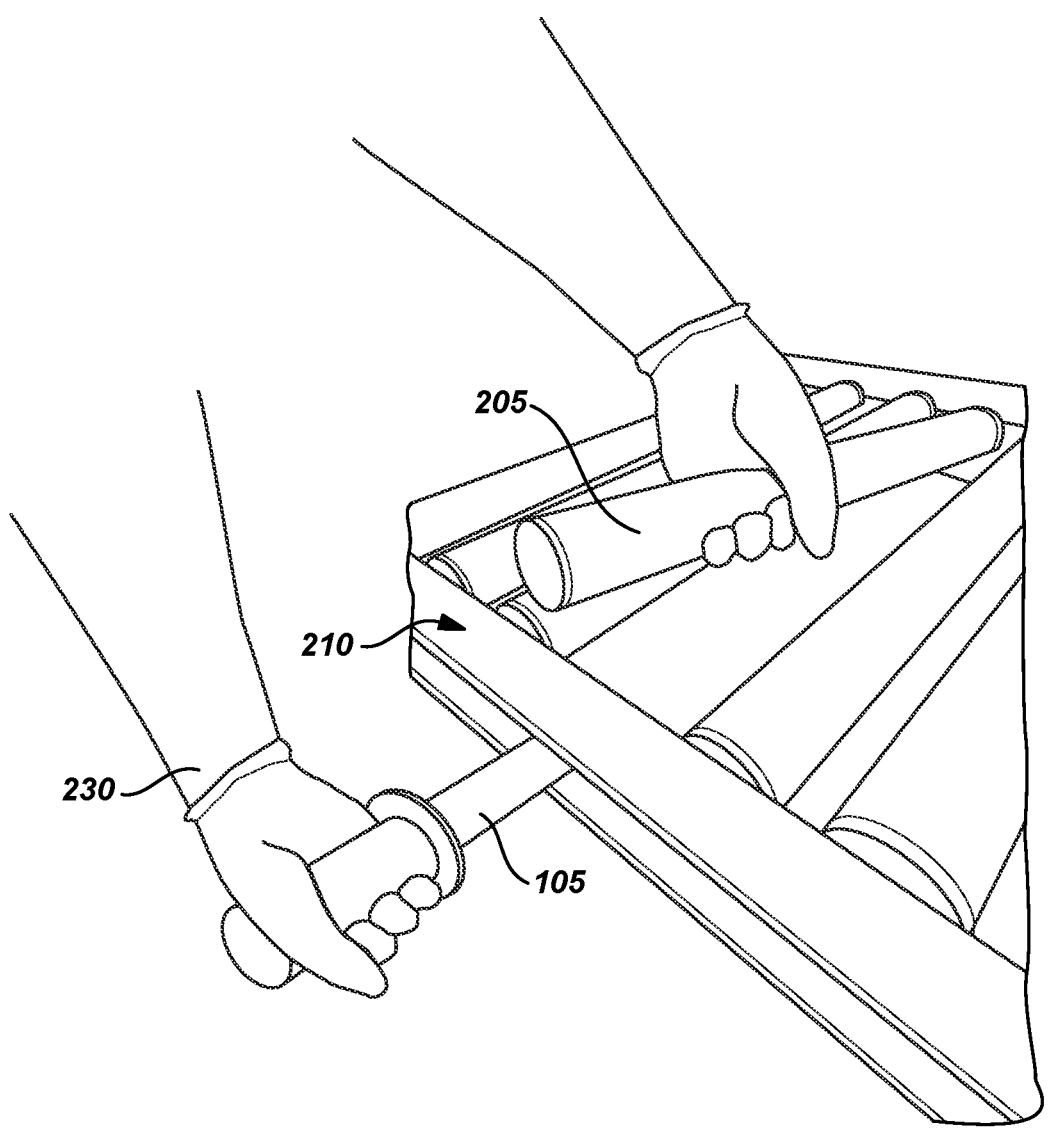
FIG. 11 is another perspective view illustrating an exemplary use of an exemplary embodiment of the present invention.

FIGS. 8-16 illustrate an exemplary use of apparatus 105. As illustrated in FIG. 8, a user (e.g., worker 230) may use apparatus 105 for maintaining, installing, repairing, and/or replacing rollers 205 of conveyor system 200. As illustrated in FIGS. 9-11 and further described below, the user may use apparatus 105 to remove a given roller 205 from roller bed assembly 210.

As illustrated in FIG. 9, a user may press apparatus 105 against components of conveyor system 200. Collar portion 635 may contact and be aligned with (e.g., centered on) movable protrusion 225 disposed in aperture 215. Based on collar portion 635 being aligned with movable protrusion 225 of roller 205, tip portion 512 of probe member 510 may be aligned with (e.g., centered on) movable protrusion 225. Apparatus 105 may be in the shielding position (e.g., as described above regarding FIG. 7A), with collar member 605 of collar assembly 600 extending out from housing wall 405 of housing assembly 400, and tip portion 512 being disposed in collar member 605, as illustrated in FIG. 9.

The user may press apparatus 105 toward conveyor system 200 so that collar portion 635 is pushed against bed wall 220, which may actuate apparatus 105 from the shielding position (e.g., described above regarding FIG. 7A) to the protruding position (e.g., described above regarding FIG. 7B) for example as illustrated in FIG. 10. As collar member 605 is pushed into and retracted into housing wall 405 of housing assembly 400, probe member 510 may remain fixedly attached to housing assembly 400 for example as described above and thereby stationary relative to the movement of collar member 605. As collar member 605 is retracted into housing wall 405, tip portion 512 may protrude from collar portion 635, with a length of tip portion 512 and probe member 510 that protrudes from collar member 605 increasing as collar member 605 is increasingly pushed into and retracted into housing wall 405. Simultaneously with an increasing length of tip portion 512 and probe member 510 protruding from collar member 605 as collar portion 635 remains pressed against bed wall 220, protruding tip portion 512 may contact movable protrusion 225 and urge or bias movable protrusion 225 out of aperture 215 and into an interior of roller 205. When apparatus 105 reaches the protruding position described above regarding FIG. 7B, tip portion 512 may extend entirely through aperture 215 and may protrude past an interior wall surface 222 of bed wall 220 for example as illustrated in FIG. 10. At this point, movable protrusion 225 may be completely removed from aperture 215 and pushed into an interior of roller 205 based on contact and urging of tip portion 512 against movable protrusion 225.

When apparatus 105 is in the protruding position illustrated in FIGS. 7B and 10, a user may grasp roller 205 and pull (e.g., pull up) on roller 205 to remove roller 205 from roller bed assembly 210 for example as illustrated in FIG. 11. Because movable protrusion 225 may be removed from aperture 215 when apparatus 105 is in the protruding position illustrated in FIGS. 7B and 10, movable protrusion 225 may no longer retain roller 205 in place in roller bed assembly 210, and therefore upward force applied to roller 205 by a user may relatively easily remove an end portion of roller 205 from roller bed assembly 210 as illustrated in FIG. 11. Any suitable installation, maintenance, replacement, or repair of roller 205 may then be performed. For example, roller 205 may be repaired or alternatively replaced with a new roller 205 for example as described below.

Figure 12:
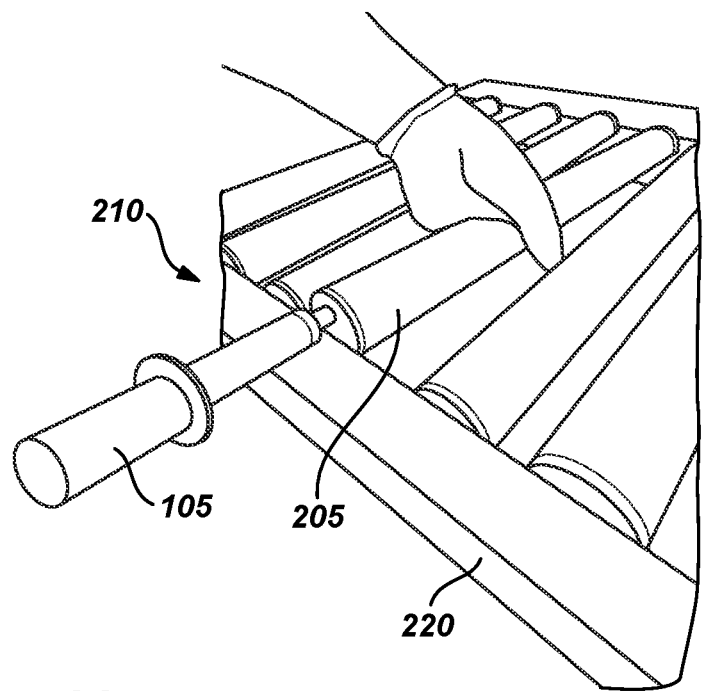
FIG. 12 is another perspective view illustrating an exemplary use of an exemplary embodiment of the present invention.
Figure 13:
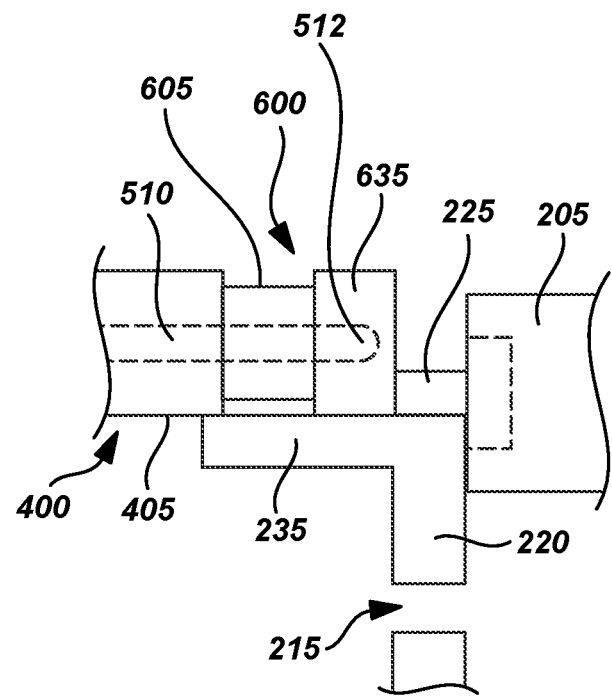
FIG. 13 is another sectional view illustrating an exemplary use of an exemplary embodiment of the present invention.

Based on suitable installation, maintenance, replacement, or repair, a repaired or a new roller 205 may be placed in roller bed assembly 210. After a first end portion of roller 205 is placed into a first bed wall 220 of roller bed assembly 210, apparatus 105 may be put into contact with a second end portion of roller 205 as illustrated in FIGS. 12 and 13. For example, apparatus 105 may be placed near or in contact with (e.g., rest against) flange 235 so that collar portion 635 contacts movable protrusion 225 (e.g., that may also be in contact with, e.g., rest against, flange 235). Apparatus 105 may be in the shielding position (e.g., as described above regarding FIG. 7A), with collar member 605 of collar assembly 600 extending out from housing wall 405 of housing assembly 400, and tip portion 512 being disposed in collar member 605, as illustrated in FIG. 13.

The user may press apparatus 105 toward roller 205 so that collar portion 635 is pushed against movable protrusion 225, which may actuate apparatus 105 from the shielding position (e.g., described above regarding FIG. 7A) to the protruding position (e.g., described above regarding FIG. 7B) for example as illustrated in FIG. 14. As collar member 605 is pushed into and retracted into housing wall 405 of housing assembly 400, probe member 510 may remain fixedly attached to housing assembly 400 for example as described above and thereby stationary relative to the movement of collar member 605. As collar member 605 is retracted into housing wall 405, tip portion 512 may protrude from collar portion 635, with a length of tip portion 512 and probe member 510 that protrudes from collar member 605 increasing as collar member 605 is increasingly pushed into and retracted into housing wall 405. Simultaneously with an increasing length of tip portion 512 and probe member 510 protruding from collar member 605 as collar portion 635 remains pressed against movable protrusion 225 and then against an end portion of roller 205 (e.g., as movable protrusion 225 is pushed into an interior of roller 205), protruding tip portion 512 may contact a portion of movable protrusion 225 (e.g., a base portion for example as illustrated in FIG. 14) and urge or bias movable protrusion 225 substantially entirely into an interior of roller 205. When apparatus 105 reaches the protruding position described above regarding FIG. 7B, tip portion 512 may extend against movable protrusion 225 disposed within an interior of roller 205 for example as illustrated in FIG. 14.

When apparatus 105 has been moved to the protruding position (e.g., described above regarding FIG. 7B) and for example as illustrated in FIG. 14, roller 205 may be relatively easily pushed (e.g., pushed down) into roller bed assembly 210. As roller 205 is pushed into roller bed assembly 210, movable protrusion 225 may contact interior wall surface 222 and remain in contact with interior wall surface 222 (e.g., interior wall surface 222 may maintain movable protrusion 225 urged or biased within an interior of roller 205). Also, once roller 205 is pushed down into roller bed assembly 210 and movable protrusion 225 is in contact with interior wall surface 222, apparatus 105 may move from the protruding position (e.g., as described regarding FIG. 7B) to the shielding position (e.g., as described regarding FIG. 7A). Roller 205 may be pushed down and guided by a user (e.g., worker 230) until movable protrusion 225 is substantially aligned with (e.g., centered on) aperture 215. When movable protrusion 225 is substantially aligned with (e.g., centered on) aperture 215, movable protrusion 225 may be urged by components (e.g., biasing components such as a spring) of roller 205 to move into aperture 215 as illustrated in FIGS. 15 and 16, thereby maintaining (e.g., locking) roller 205 in place in roller bed assembly 210. Conveyor system 200 including repaired or replaced roller 205 may then be utilized for normal operations.

Figure 17:
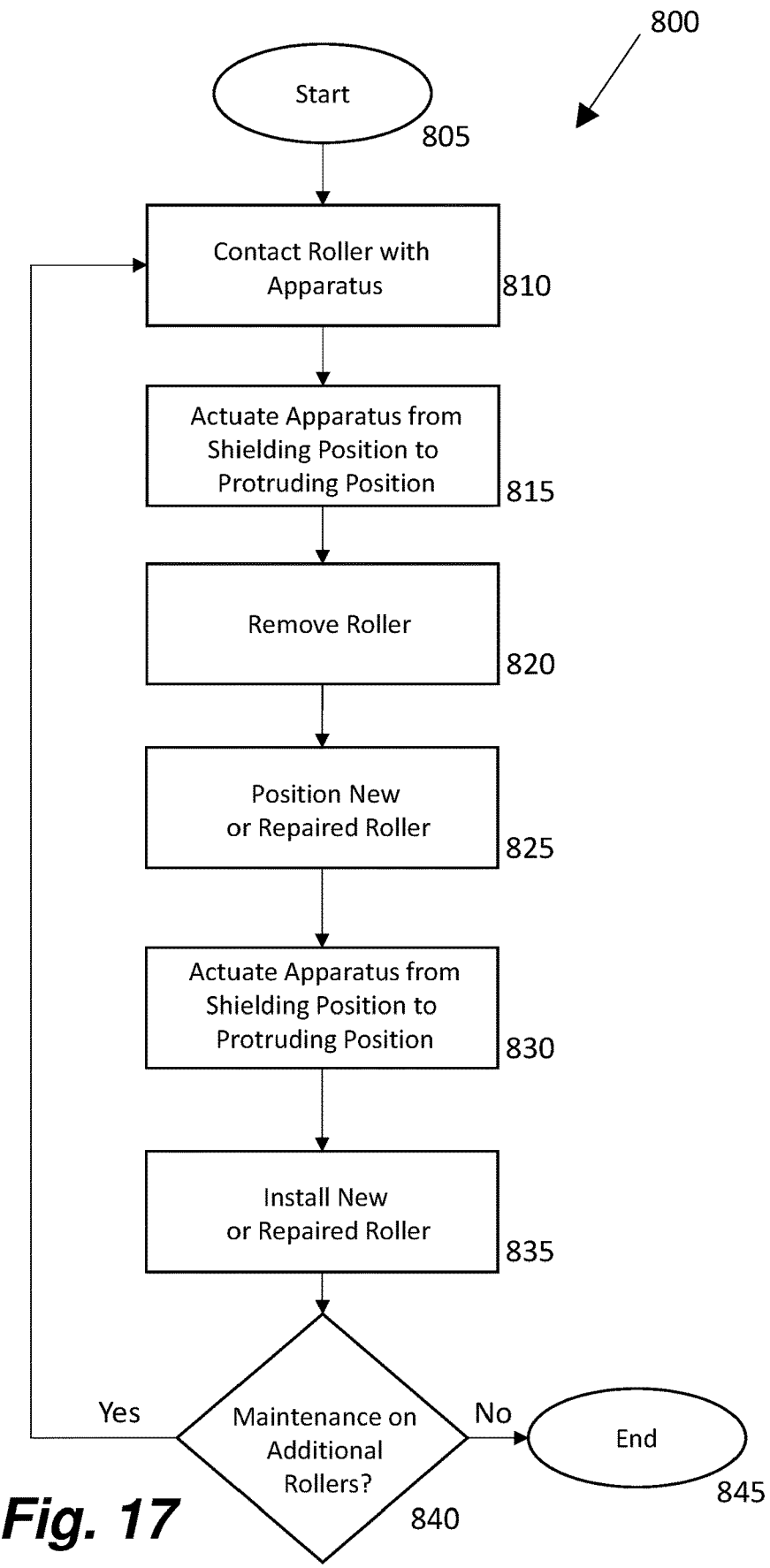
FIG. 17 illustrates an exemplary process of using at least some exemplary embodiments of the present disclosure.

FIG. 17 illustrates an exemplary process of using the exemplary disclosed system and apparatus. Process 800 begins at step 805. At step 810, roller 205 may be contacted with apparatus 105 for example as described above regarding FIGS. 8 and 9. At step 815, apparatus 105 may be actuated from the shielding position to the protruding position to remove movable protrusion 225 from aperture 215 for example as described above regarding FIG. 10. At step 820, roller 205 may be removed from roller bed assembly 210 for example as described above regarding FIG. 11 (e.g., and apparatus 105 may move from the protruding position back to the shielding position based on biasing of biasing member 700 when apparatus 105 is removed from contact with conveyor system 200 including roller 205). At step 825, new or repaired roller 205 (e.g., and apparatus 105) may be positioned relative to roller bed assembly 210 for example as described above regarding FIGS. 12 and 13. At step 830, apparatus 105 may be actuated from the shielding position to the protruding position to move movable protrusion 225 into an interior of roller 205 for example as described above regarding FIG. 14. At step 835, new or repaired roller 205 may be installed for example as described above regarding FIGS. 15 and 16. At step 840 it may be determined whether maintenance is to be performed on additional rollers 205. If maintenance on additional rollers 205 is to be performed, process 800 returns to step 810. As many iterations as desired of steps 810 through 840 may be performed. If maintenance on additional rollers 205 is not to be performed, process 800 ends at step 845.

In at least some exemplary embodiments, the exemplary disclosed apparatus may be an apparatus for a conveyor system. The exemplary disclosed apparatus may include a housing assembly (e.g., housing assembly 400), a protrusion assembly (e.g., protrusion assembly 500) including a base member and a probe member, the base member being attached to the housing assembly, a collar assembly (e.g., collar assembly 600) that is movably attached to the housing assembly and movable between a first position and a second position, and a biasing member (e.g., biasing member 700) disposed in the housing assembly and configured to bias the collar assembly away from the base member and to the first position. A tip portion of the probe member may be disposed in the collar assembly in the first position and the tip portion may protrude out of the collar assembly in the second position. The collar assembly may include a collar end cavity that is configured to receive a conveyor component of the conveyor system. The biasing member may be disposed between the collar assembly and the base member. The probe member may extend through the biasing member. The collar end cavity may be configured to receive the conveyor component that is a movable protrusion of a roller of the conveyor system. The protrusion assembly including the tip portion may be fixedly attached to and may remain stationary relative to the housing assembly, while the collar assembly may be movable relative to the housing assembly and the protrusion assembly. The biasing member may be a spring. The probe member may be disposed in a cavity of the collar assembly that includes the collar end cavity. The collar assembly may include a slot configured to receive a dowel pin of the housing assembly. The slot may move relative to the dowel pin when the collar assembly is moved between the first position and the second position. The collar assembly may be retained in the housing assembly when the collar assembly is in the first position based on the dowel pin biasing against a slot end wall of the collar assembly forming an end portion of the slot. The exemplary disclosed apparatus may also include a handle assembly attached to the housing assembly at a portion of the housing assembly in which the base member is disposed.

In at least some exemplary embodiments, the exemplary disclosed method may be a method for removing a roller from a roller bed assembly of a conveyor system. The exemplary disclosed method may include using a tool including a housing assembly (e.g., housing assembly 400), a protrusion assembly (e.g., protrusion assembly 500) including a base member and a probe member, the base member being attached to the housing assembly, a collar assembly (e.g., collar assembly 600) that is movably attached to the housing assembly and movable between a first position and a second position, the collar assembly having a collar end cavity, and a biasing member (e.g., biasing member 700) disposed in the housing assembly and configured to bias the collar assembly away from the base member and to the first position. The exemplary disclosed method may also include contacting the roller with the tool so that a movable protrusion of the roller is received in the collar end cavity, and pressing the tool against the movable protrusion so that the collar assembly is moved from the first position to the second position, with a tip portion of the probe member moving from within the collar assembly in the first position to protrude out of the collar assembly in the second position. The exemplary disclosed method may further include pushing the movable protrusion into an interior of the roller based on pushing the movable protrusion with the tip portion protruding out of the collar assembly in the second position. The exemplary disclosed method may also include removing the roller from the roller bed assembly by pulling on the roller when pushing the movable protrusion out of an aperture of the roller bed assembly and into the interior of the roller based on pushing the movable protrusion with the tip portion. The exemplary disclosed method may further include replacing the roller or installing a new roller in the roller bed assembly based on inserting the roller or the new roller into the roller bed assembly while pushing the movable protrusion into the interior of the roller using the tip portion of the tool with the collar assembly in the second position, and aligning the movable protrusion with the aperture of the roller bed assembly. The biasing member may bias the collar assembly from the second position to the first position when the tip portion and the collar assembly are removed from the movable protrusion. The protrusion assembly including the tip portion may be fixedly attached to and may remain stationary relative to the housing assembly, while the collar assembly may be movable relative to the housing assembly and the protrusion assembly. The movable protrusion may be a spring-loaded hex head shaft that is selectively movable into an interior of the roller.

In at least some exemplary embodiments, the exemplary disclosed tool may be a tool for a conveyor system. The exemplary disclosed tool may include a housing assembly (e.g., housing assembly 400), a protrusion assembly (e.g., protrusion assembly 500) including a base member and a probe member, the base member being fixedly attached to the housing assembly, a collar assembly (e.g., collar assembly 600) that is movably attached to the housing assembly and movable between a first position and a second position, and a spring disposed in the housing assembly and configured to bias the collar assembly away from the base member and to the first position. A tip portion of the probe member may be disposed in the collar assembly in the first position and the tip portion may protrude out of the collar assembly in the second position. The collar assembly may include a collar end cavity that is configured to receive a movable protrusion of a roller of the conveyor system. The spring may be disposed between the collar assembly and the base member. The collar assembly may include a slot configured to receive a dowel pin of the housing assembly, the slot movable relative to the dowel pin when the collar assembly is moved between the first position and the second position.

In at least some exemplary embodiments, the exemplary disclosed system, apparatus, and method may provide an efficient and effective system for removing and/or replacing conveyor components such as conveyor system rollers. For example, the exemplary disclosed system, apparatus, and method may provide a technique for using a tool to actuate a roller component without the tool slipping. Also for example, the exemplary disclosed system, apparatus, and method may provide a technique for safely removing and/or replacing conveyor rollers without a risk of workers cutting themselves with a tool. The exemplary disclosed system, apparatus, and method may also provide a tool that is suitably configured for use in removing and/or replacing components such as conveyor rollers.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus for a conveyor system, comprising:
    a housing assembly;
    a protrusion assembly including a base member and a probe member, the base member being attached to the housing assembly;
    a collar assembly that is movably attached to the housing assembly and movable between a first position and a second position; and
    a biasing member disposed in the housing assembly and configured to bias the collar assembly away from the base member and to the first position;
    wherein a tip portion of the probe member is disposed in the collar assembly in the first position and the tip portion protrudes out of the collar assembly in the second position;
    wherein the collar assembly includes a collar end cavity that is configured to receive a conveyor component of the conveyor system; and
    wherein the probe member is disposed in a cavity of the collar assembly that includes the collar end cavity.

2. The apparatus of claim 1, wherein the biasing member is disposed between the collar assembly and the base member.

3. The apparatus of claim 1, wherein the probe member extends through the biasing member.

4. The apparatus of claim 1, wherein the collar end cavity is configured to receive the conveyor component that is a movable protrusion of a roller of the conveyor system.

5. The apparatus of claim 1, wherein the protrusion assembly including the tip portion is fixedly attached to and remains stationary relative to the housing assembly, while the collar assembly is movable relative to the housing assembly and the protrusion assembly.

6. The apparatus of claim 1, wherein the biasing member is a spring.

7. The apparatus of claim 1, wherein the collar assembly includes a slot configured to receive a dowel pin of the housing assembly.

8. The apparatus of claim 7, wherein the slot moves relative to the dowel pin when the collar assembly is moved between the first position and the second position.

9. The apparatus of claim 7, wherein the collar assembly is retained in the housing assembly when the collar assembly is in the first position based on the dowel pin biasing against a slot end wall of the collar assembly forming an end portion of the slot.

10. The apparatus of claim 1, further comprising a handle assembly attached to the housing assembly at a portion of the housing assembly in which the base member is disposed.

11. A method for removing a roller from a roller bed assembly of a conveyor system, comprising:
    using a tool including
        a housing assembly;
        a protrusion assembly including a base member and a probe member, the base member being attached to the housing assembly;
        a collar assembly that is movably attached to the housing assembly and movable between a first position and a second position, the collar assembly having a collar end cavity; and
        a biasing member disposed in the housing assembly and configured to bias the collar assembly away from the base member and to the first position;
    contacting the roller with the tool so that a movable protrusion of the roller is received in the collar end cavity;

pressing the tool against the movable protrusion so that the collar assembly is moved from the first position to the second position, with a tip portion of the probe member moving from within the collar assembly in the first position to protrude out of the collar assembly in the second position; and pushing the movable protrusion into an interior of the roller based on pushing the movable protrusion with the tip portion protruding out of the collar assembly in the second position.

12. The method of claim 11, further comprising removing the roller from the roller bed assembly by pulling on the roller when pushing the movable protrusion out of an aperture of the roller bed assembly and into the interior of the roller based on pushing the movable protrusion with the tip portion.

13. The method of claim 12, further comprising replacing the roller or installing a new roller in the roller bed assembly based on inserting the roller or the new roller into the roller bed assembly while pushing the movable protrusion into the interior of the roller using the tip portion of the tool with the collar assembly in the second position, and aligning the movable protrusion with the aperture of the roller bed assembly.

14. The method of claim 11, wherein the biasing member biases the collar assembly from the second position to the first position when the tip portion and the collar assembly are removed from the movable protrusion.

15. The method of claim 11, wherein the protrusion assembly including the tip portion is fixedly attached to and remains stationary relative to the housing assembly, while the collar assembly is movable relative to the housing assembly and the protrusion assembly.

16. The method of claim 11, wherein the movable protrusion is a spring-loaded hex head shaft that is selectively movable into an interior of the roller.

17. A tool for a conveyor system, comprising:
a housing assembly;
a protrusion assembly including a base member and a probe member, the base member being fixedly attached to the housing assembly;
a collar assembly that is movably attached to the housing assembly and movable between a first position and a second position; and
a spring disposed in the housing assembly and configured to bias the collar assembly away from the base member and to the first position;
wherein a tip portion of the probe member is disposed in the collar assembly in the first position and the tip portion protrudes out of the collar assembly in the second position;
wherein the collar assembly includes a collar end cavity that is configured to receive a movable protrusion of a roller of the conveyor system; and
wherein the spring is disposed between the collar assembly and the base member.

18. The tool of claim 17, wherein the collar assembly includes a slot configured to receive a dowel pin of the housing assembly, the slot movable relative to the dowel pin when the collar assembly is moved between the first position and the second position.

19. An apparatus for a conveyor system, comprising:
a housing assembly;
a protrusion assembly including a base member and a probe member, the base member being attached to the housing assembly;
a collar assembly that is movably attached to the housing assembly and movable between a first position and a second position; and
a biasing member disposed in the housing assembly and configured to bias the collar assembly away from the base member and to the first position;
wherein a tip portion of the probe member is disposed in the collar assembly in the first position and the tip portion protrudes out of the collar assembly in the second position;
wherein the collar assembly includes a collar end cavity that is configured to receive a conveyor component of the conveyor system; and
wherein the collar assembly includes a slot configured to receive a dowel pin of the housing assembly.

20. A method for removing a roller from a roller bed assembly of a conveyor system, comprising:
using a tool including
a housing assembly;
a protrusion assembly including a base member and a probe member, the base member being attached to the housing assembly;
a collar assembly that is movably attached to the housing assembly and movable between a first position and a second position, the collar assembly having a collar end cavity; and
a biasing member disposed in the housing assembly and configured to bias the collar assembly away from the base member and to the first position;
contacting the roller with the tool so that a movable protrusion of the roller is received in the collar end cavity; and
pressing the tool against the movable protrusion so that the collar assembly is moved from the first position to the second position, with a tip portion of the probe member moving from within the collar assembly in the first position to protrude out of the collar assembly in the second position;
wherein the movable protrusion is a spring-loaded hex head shaft that is selectively movable into an interior of the roller.

21. The apparatus of claim 20, wherein the probe member is disposed in a cavity of the collar assembly that includes the collar end cavity.

22. The apparatus of claim 20, wherein the collar assembly includes a slot configured to receive a dowel pin of the housing assembly.

23. The apparatus of claim 22, wherein the slot moves relative to the dowel pin when the collar assembly is moved between the first position and the second position.

* * * * *